Figure 1:
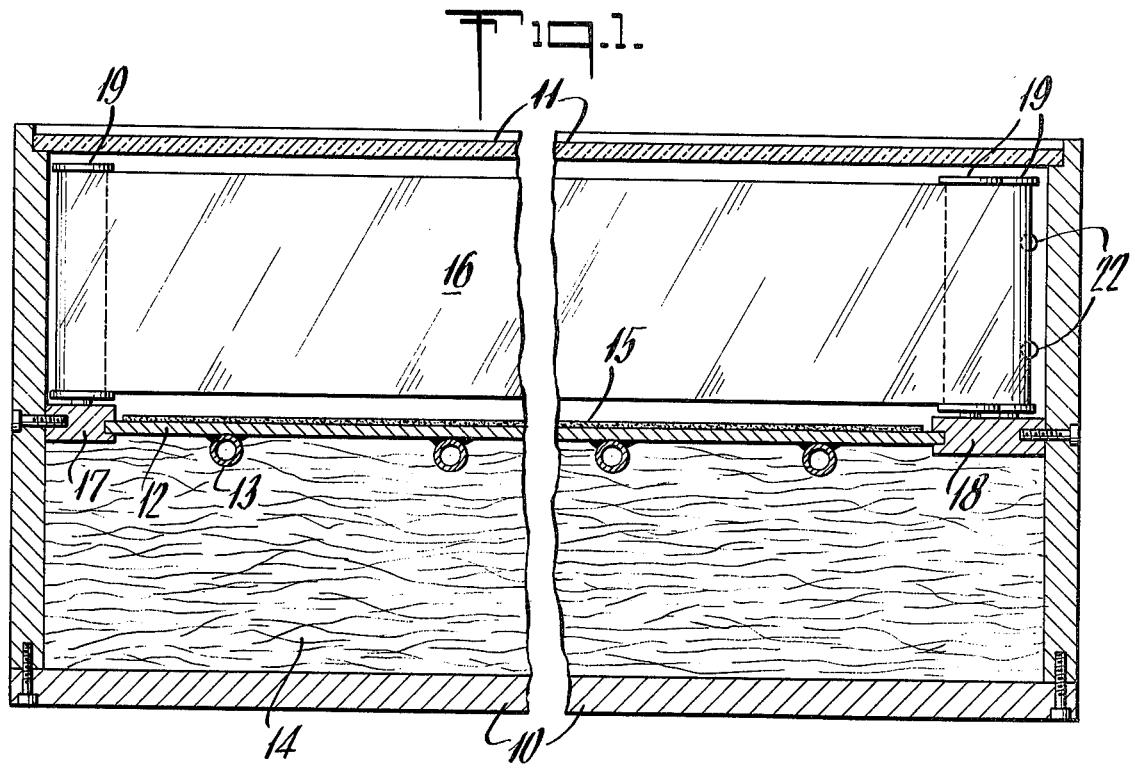

United States Patent [19]

Golay

[11] 4,084,574
[45] Apr. 18, 1978

[54] HEAT INSULATOR

[75] Inventor: Marcel J. E. Golay, 1095 Lutry, Vaud, Switzerland

[73] Assignee: Marcel Golay, Switzerland

[21] Appl. No.: 591,694

[22] Filed: Jun. 30, 1975

[51] Int. Cl.² .................................................. F24J 3/02
[52] U.S. Cl. ........................................ 126/270; 126/271
[58] Field of Search ............................... 126/270, 271

[56] References Cited

U.S. PATENT DOCUMENTS

| B 512,745 | 1/1976 | Deminet et al. | 126/271 |
| 1,056,861 | 3/1913 | Walker | 126/271 |
| 1,240,890 | 9/1917 | Shuman et al. | 126/271 |
| 1,338,644 | 4/1920 | Arthur et al. | 126/271 |
| 2,274,492 | 2/1942 | Modine | 126/271 |
| 2,705,948 | 4/1955 | Rostock | 126/271 |
| 3,039,453 | 6/1962 | Andrassy | 126/271 |
| 3,129,703 | 4/1964 | Tabor | 126/270 |
| 3,146,774 | 9/1964 | Yellott | 126/271 |
| 3,898,979 | 8/1975 | Medico, Jr. | 126/271 |
| 3,980,071 | 9/1976 | Barber, Jr. | 126/271 |
| 3,981,294 | 9/1976 | Deminet et al. | 126/271 |
| 4,015,583 | 4/1977 | Laing | 126/271 |

Primary Examiner—John J. Camby
Assistant Examiner—Henry C. Yuen
Attorney, Agent, or Firm—Eugene E. Geoffrey, Jr.

[57] ABSTRACT

Solar radiation absorber having absorbing means within a gas filled housing and an overlying radiation transparent plate spaced therefrom. Ribbons of thin material are disposed between the absorbing means and the plate to restrict convective heat losses.

4 Claims, 2 Drawing Figures

HEAT INSULATOR

This invention relates to solar energy absorbing apparatus and more specifically to a novel and improved radiation absorber which greatly increases the efficiency of radiation absorption by minimizing convective losses of the absorbed radiation.

Prior known solar energy heat absorbers have generally utilized flat glass windows spaced a few centimeters from the absorbing means such as a plate having piping affixed thereto. The absorbing means was usually provided with a selective black surface to effect absorption of the solar radiation while minimizing reradiation of heat in the 5 to 15 micron wavelength range. However, a layer of air or gas was generally utilized as the insulating means between the window and the absorber in order to avoid submission of the window to large forces that would be encountered if the space between the window and the absorber was evacuated. Such structures have been found to lose a considerable quantity of heat by reason of convection and it has been found that if an absorber at a temperature of approximately 80° C is separated from the window by approximately 5 centimeters of air and the window is at a temperature of approximately 20° C the loss of heat would be approximately 5 times that which would be encountered were it not for convection.

This invention overcomes the difficulties heretofore encountered in known solar energy absorbers and provides a novel and improved heat insulating barrier which greatly reduces the loss of heat through convection and at the same time avoids subjection of the window to the substantial pressures that would be involved by the utilization of a vacumn.

Figure 2:
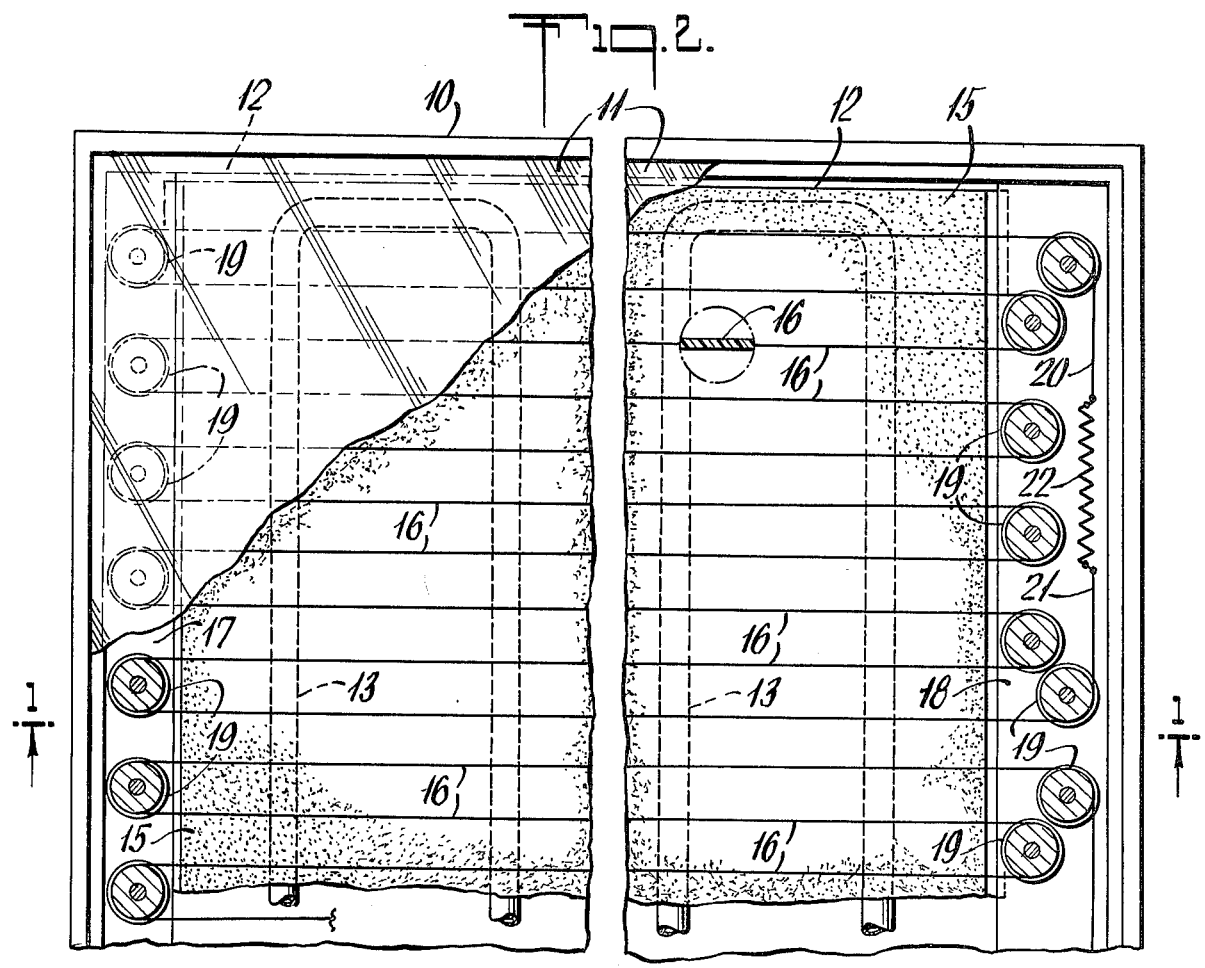

The above and other objects and advantages of the invention will become more apparent from the following description and accompanying drawings forming part of this application. In the drawings:

FIG. 1 is a cross-sectional view of a solar energy absorber in accordance with the invention taken along the line 1—1 of FIG. 2, and FIG. 2 is a plan view of the structure shown in FIG. 1.

Solar energy absorbers or captors have utilized piping for the circulation of liquid therethrough which piping was carried by a heat conducting element having a black surface in order to effectively absorb solar radiation. A flat glass window is generally positioned a few centimeters from the heat absorbing element with air or gas filling the space therebetween. As pointed out above, it has been found that circulation of such air or gas will produce a substantial loss in absorbed heat because of the movement of air or gas which carries heat from the absorber to the glass window. When there is a substantial temperature difference between the window and the heat absorber a substantial amount of the absorbed radiation energy will be lost by convection. By way of example to indicate the magnitude of the heat loss of known solar energy absorbers, a fairly bright or sunny day will produce solar radiation of approximately 0.08 watts per $cm^2$ normal to the sun rays. If a flat collector is at an angle of arc cos 0.8 with respect to a normal to the sun rays, the energy received by the collector will be approximately 0.64 watts per $cm^2$. Assuming that the absorber is at a temperature of approximately 80° C and that the air temperature surrounding the absorber is approximately 20° C the loss of heat to the glass will be far greater than the loss of heat from the back of the absorber which would normally be insulated by a layer of glass wool or other similar heat insulating material since such material reduces convection to a substantial extent. The loss of heat to the glass however can be estimated by reason of the fact that turbulent air in an unrestricted area conveys heat to within a few millimeters of the glass and also absorbs heat within a few millimeters of the absorbing surface. Assuming an equivalent air thickness of about 8mm across a 5cm gap which air can circulate, the heat loss per $cm^2$ can be determined as follows:

$$\frac{(80°\ C - 20°\ C) \times .00024\ watt\ cm^{-1}\ °C^{-1}}{.8\ cm} = .018\ \frac{watt}{cm^2}$$

where .00024 watts $cm^{-1}\ °C^{-1}$ is the thermal conductivity of air. The Figure of .018 watts per cm represents a loss of about 28% of the imcoming radiation which was calculated to be approximately 0.064 watts/$cm^2$.

With this invention and assuming a 5 centimeter gap, the loss across the gap will be $$\frac{(80°\ C - 20°\ C) \times .00024\ watt\ cm^{-1}\ °C^{-1}}{5\ cm} = .00288\ watt/cm^2$$

It will be noted that this loss is approximately 1/6 of the loss incurred without the baffling means to be described.

This substantial reduction in heat loss through convection can be attained by the structure shown in FIGS. 1 and 2 of the drawings. Referring now to these Figures, the numeral 10 denotes an essentially rectangular housing formed wood, plastic or other similar material having a layer of glass 11 closing the top side thereof. A flat plate 12 of a good heat conducting material is disposed within the housing and in spaced, substantially parallel relationship to the glass plate 11. A plurality of tubes 13 are fixed to the underside of the plate 12 and in heat conducting relationship thereto. The space between the plate 12 and the bottom of the housing 10 is preferably filled with glass wool 14 or other suitable heat insulating material in order to restrict the movement of air in this area and thus effectively minimize the loss of heat from the back side of the plate 12 and the tubing 13.

The front surface of the heat conducting plate 12 is preferably coated by a selective black radiation absorbing coating 15 and the distance between the coating and the inner surface of the glass plate 11 may be of the order of 5 centimeters which has been found to be sufficient to attain the objectives of this invention. The air within the space between the plate 12 and the glass plate 11 is kept quiescent by means of thin transparent ribbons of plastic or glass which are preferably maintained in a reasonably taught condition. The ribbons, denoted by the numeral 16, are preferably spaced approximately 1 centimeter apart and extend to about 1 to 2 millimeters of the glass plate and about 2 to 5 millimeters of the surface of the coating on plate 12. Should the ribbons be relatively rigid and inelastic they can be supported in position by any suitable means. However, materials formed of a suitable plastic are highly effective particularly inasmuch as it is desirable that the ribbons be but a few tens of microns in thickness.

Since most plastics are not rigid and will tend to stretch in the presence of heat a structure such as illustrated in FIGS. 1 and 2 would be effective in order to maintain the ribbons in a taught spaced parallel relationship. A pair of supports 17 and 18 are secured to and extend inwardly from two side walls of the housing 10 and are positioned in a substantially coplanar relationship with the plate 12. A plurality of rollers 19 are secured to the supports 16 and 17 and extend upwardly therefrom. The ribbon 16 is then threaded about the rollers 19 as illustrated more clearly in FIG. 2 and the ends 20 and 21 are coupled by a tension spring 22 in order to maintain the ribbon 16 under tension at all times. For convenience, the ribbons can be installed in sections in order to limit the total length of ribbon to be held taught be a single spring and in this way large areas can be covered. Alternately weights may be utilized to maintain the ribbons under tension.

While any of a variety of plastics may be employed which do not flow appreciately at temperatures of the order of 50° to 90° C it has been found that polyvinyl chloride or polyethelene terephthalate, known in a trade as Mylar, have been found to be effective. The thickness of ribbons formed of these plastics is preferably of the order to 0.02 to .1 millimeters.

Inasmuch as the ribbons 16 are substantially transparent to radiation from the surf they will not absorb any appreciable amount of such radiation and any radiation they reflect will necessarily be reflected in the direction of the plate 12 and thereby will not affect in any way efficiency of the system as a whole.

The tubes 13 may conduct any suitable liquid such as water or any material having a suitable specific heat and fluidity change in the 50° to 90° centigrade range. The tubes, of course, are coupled with a suitable tank, so that the water can be circulated continuously through the tubes and thereby provide a continuous removal of heat from the plate 12.

It is evident from the foregoing, that the ribbons can br installed in any suitable manner that will cause them to maintain their spaced parallel relationship and not sag or become loose since that would greatly reduce their effectiveness. It is also evident that other changes, modifications and alterations may be made without departing from the scope and spirit of the invention as defined by the following claims.

What is claimed is:

1. Radiant heat absorbing apparatus comprising a housing having at least one clear side, radiation absorbing means in said housing comprising a radiation absorbing surface facing said clear side, a radiation transparent plate closing said clear side of the housing and a plurality of spaced ribbonlike elements extending between and spaced from said radiation absorbing surface and said transparent plate to restrict circulation of gas between said surface and said plate and minimize loss of heat through convection, said ribbonlike elements being very thin and said housing includes ribbon supporting means along a pair of opposite edges of said radiation absorbing means, said supporting means maintaining said ribbons in tension, said supporting means each comprising a plurality of rollers, said ribbon is threaded about said rollers and tensioning means is attached to at least one end of said ribbon to maintain it under tension at all times.

2. Radiant heat absorbing apparatus according to claim 1 wherein said radiation means and said transparent plate are substantially parallel and said ribbons are disposed normal to said absorbing means.

3. Radiant heat absorbing means according to claim 2 wherein the distance between said radiation absorbing surface and said transparent plate is of the order of 5cm, said inner and outer edges of said ribbons are spaced from said surface and said plate by distances of the order of 1 to 3 mm and said ribbons are spaced about 1cm apart.

4. Radiant heat absorbing means according to claim 3 wherein said radiation absorbing means comprises a flat plate of heat conductive material with piping secured thereto in heat transfering relationship.

* * * * *